United States Patent
Reichhardt

(10) Patent No.: US 10,993,364 B2
(45) Date of Patent: May 4, 2021

(54) DISPLAY AND INPUT SYSTEM FOR AN AGRICULTURAL MACHINE

(71) Applicant: Andreas Reichhardt, Hungen (DE)

(72) Inventor: Andreas Reichhardt, Hungen (DE)

( * ) Notice: Subject to any disclaimer, the term of this patent is extended or adjusted under 35 U.S.C. 154(b) by 0 days.

(21) Appl. No.: 15/174,121

(22) Filed: Jun. 6, 2016

(65) Prior Publication Data

US 2017/0024107 A1    Jan. 26, 2017

(30) Foreign Application Priority Data

Jul. 22, 2015    (DE) ...................... 10 2015 111 911.0

(51) Int. Cl.
*A01B 76/00*    (2006.01)
*G08C 17/02*    (2006.01)
*H04W 4/80*    (2018.01)

(52) U.S. Cl.
CPC .............. *A01B 76/00* (2013.01); *G08C 17/02* (2013.01); *H04W 4/80* (2018.02)

(58) Field of Classification Search
CPC .......... G08C 17/02; A01B 76/00; H04W 4/80
USPC ........................................................ 715/201
See application file for complete search history.

(56) References Cited

U.S. PATENT DOCUMENTS

| | | | |
|---|---|---|---|
| 5,305,055 A | 4/1994 | Ebner et al. | |
| 5,361,265 A | 11/1994 | Weinberger et al. | |
| 6,948,175 B1 | 9/2005 | Fong et al. | |
| 7,296,283 B2 | 11/2007 | Hrastar et al. | |
| 7,413,513 B2 | 8/2008 | Nguyen et al. | |
| 9,098,114 B2 | 8/2015 | Potter et al. | |
| 2001/0035729 A1* | 11/2001 | Graiger .................. | G08C 17/02 318/587 |

(Continued)

FOREIGN PATENT DOCUMENTS

| | | |
|---|---|---|
| DE | 2457512 A1 | 6/1976 |
| DE | 2525042 A1 | 12/1976 |

(Continued)

OTHER PUBLICATIONS

Wikipedia: Bottleneck and Wikipedia: Bottleneck_network as appearing on Oct. 1, 2014.*

(Continued)

*Primary Examiner* — Stephen S Hong
*Assistant Examiner* — Broderick C Anderson
(74) *Attorney, Agent, or Firm* — Collard & Roe, P.C.

(57) ABSTRACT

A system for an agricultural machine for displaying machine-specific information and inputting machine-specific commands comprising a programmable electronic control unit (1) comprises a microcontroller having an interface for connection to a bus system (2) belonging to the machine. The control unit (1) further comprises wired or wireless communication means for setting up a wireless or wired communication connection (4) to a mobile computer unit (3), such that the control unit (1) is connected for data exchange to the mobile computer unit (3). The control unit (1) is connected, on one hand, to a tractor control device (5) and other participants (6) of the bus system (2) by means of the machine's bus system (2), and on the other hand to the mobile computer unit (3). The mobile computer unit (3) is used for displaying machine-specific information and inputting machine-specific commands.

9 Claims, 1 Drawing Sheet

(56) References Cited

U.S. PATENT DOCUMENTS

| | | |
|---|---|---|
| 2004/0030779 A1 | 2/2004 | Motoyama et al. |
| 2004/0205375 A1 | 10/2004 | Osawa |
| 2005/0083196 A1 | 4/2005 | Furem et al. |
| 2005/0248792 A1 | 11/2005 | Wright |
| 2007/0253380 A1 | 11/2007 | Jollota et al. |
| 2009/0107102 A1* | 4/2009 | Biziorek .............. A01F 15/0715 56/341 |
| 2009/0157356 A1 | 6/2009 | Jiang et al. |
| 2011/0177780 A1* | 7/2011 | Sato ...................... H04W 36/14 455/41.1 |
| 2012/0316735 A1* | 12/2012 | Von Mezynski ....... B60Q 1/085 701/48 |
| 2013/0064094 A1 | 3/2013 | Nakao et al. |
| 2014/0045147 A1* | 2/2014 | Mohn ...................... G07C 5/00 434/69 |
| 2014/0062723 A1* | 3/2014 | Kluge ..................... G08C 17/02 340/870.07 |
| 2015/0225188 A1* | 8/2015 | Belluk ................... G08C 17/02 700/230 |
| 2015/0366124 A1* | 12/2015 | Kremmer ............... A01B 59/06 701/2 |
| 2016/0006864 A1 | 1/2016 | Park et al. |
| 2016/0246296 A1* | 8/2016 | Gelinske ................. H04W 4/70 |
| 2016/0264387 A1* | 9/2016 | Yoon .......................... B66F 9/08 |
| 2016/0325754 A1* | 11/2016 | Stahulak ............... B60W 40/08 |

FOREIGN PATENT DOCUMENTS

| | | |
|---|---|---|
| DE | 102014211712 A1 | 2/2015 |
| GB | 1524544 A | 9/1978 |

OTHER PUBLICATIONS

IEEE 802.22, 4 pages (Jul. 2011).

VDMA, AEM, North American ISOBUS Implementation Task Force, ISOBUS Specification, Implementation Level 4—Annex 2, Sep. 2, 2008, 3 pages.

VDMA, AEM, North American ISOBUS Implementation Task Force, ISOBUS Specification, Implementation Level 3, Jul. 30, 2006, 6 pages.

VDMA, Agricultural Machinery Association, Revised "Implementation Level 4 Annex 1" document, 2 pages (Jan. 20, 2009).

* cited by examiner

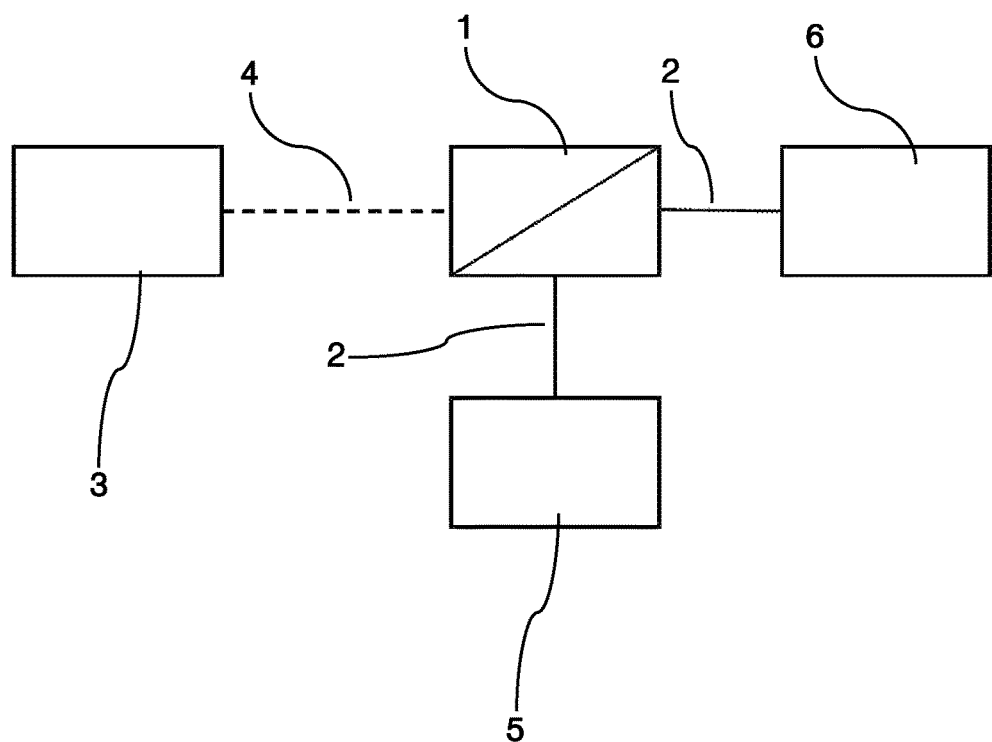

DISPLAY AND INPUT SYSTEM FOR AN AGRICULTURAL MACHINE

CROSS REFERENCE TO RELATED APPLICATIONS

Applicants claim priority under 35 U.S.C. § 119 of German Patent Application No. 10 2015 111 911.0 filed Jul. 22, 2015.

FIELD OF THE INVENTION

The invention relates to a system for an agricultural machine for displaying machine-specific information and inputting machine-specific commands, comprising a programmable electronic control unit.

BACKGROUND OF THE INVENTION

Agricultural machines, more particularly motor-driven vehicles for agriculture and forestry and associated mounted implements, often have a programmable electronic control unit for controlling various drive and device components. The control unit is connected to actuators and optionally to mounted implements by means of a network or control bus system belonging to the machine, and comprises a user interface on which control commands and controlling parameters can be input or selected. The user interface allows target values for particular parameters to be input, and has a graphic display panel on which input target values and operating parameters and functional signals of the machine that are measured by sensors can be displayed. In many cases, the display panel is also provided with a touch input function in order to make it simpler to input various parameters. In agricultural vehicles and mobile agricultural machines, use is often made of control bus systems and user interfaces according to the ISO 11783 standard, which is widely known as ISOBUS.

The user interface can form a man-machine interface to the ISOBUS in the form of a "virtual terminal" (VT). The VT generally has a display screen and operating elements. Each device connected to the ISOBUS logs into the VT and loads an object pool on the VT. By means of the object pool, information about the device in question can be consulted and adjustments can be made. The disadvantage is, however, that the VT is often low-resolution and no longer meets the current technical standard, particularly with relatively old agricultural machines. The VT is mounted on one side of the driver's cab and the position thereof cannot be changed. This has the major disadvantage that, depending on his seating position, the driver of the agricultural machine may not be able to optimally see and operate the VT, or may not be able to do so at all. The driver can use other operating elements, such as a joystick, which can generally also be positioned in various positions accessible to the driver. However, these operating elements do not have any visual display means and are merely provided for operating the agricultural machine or the mounted implements.

SUMMARY OF THE INVENTION

The object of the invention is to provide an alternative and in particular mobile display that can be used by the driver of the agricultural machine as a user interface and which can be more easily seen.

According to the invention, this object is accomplished by a system for an agricultural machine for displaying machine-specific information and inputting machine-specific commands, comprising a programmable electronic control unit that comprises a microcontroller having an interface for connection to a bus system belonging to the machine, the control unit being connected for data exchange to a mobile computer unit via either wired or wireless communication means. A system is thus provided that is integrated in a bus system belonging to the machine and uses a mobile computer unit, which for its part is not directly integrated in the machine's bus system, for displaying machine-specific information and inputting machine-specific commands. The control unit acts as the link between the machine's bus system and the mobile computer unit, the microcontroller substantially forming the bottleneck since it controls which data reach the bus system from the mobile computer unit, and vice versa.

By means of the communication means, a wired or wireless communication connection can be established between the control unit and the mobile computer unit. The control unit can be connected to the machine's bus system via the interface and can thus be used for controlling various drive and device components of the agricultural machine. Within the meaning of the invention, an agricultural machine may be a machine or a corresponding motor vehicle suitable for agriculture and forestry. The control unit is connected to the mobile computer unit, the mobile computer unit in particular comprising a display screen and operating elements.

The mobile computer unit is connected to the control unit via wired or wireless communication means, and so data can be exchanged via the communication connection and it is possible to display machine-specific information and input machine-specific commands by means of the mobile computer unit. In other words, the mobile computer unit is a display and input means for the control unit, since said control unit does not have its own display or corresponding input means. It may simply be advantageous for the control unit to have a basic display unit that can be used for displaying error messages, for example. It is also conceivable for the control unit to have connections, by means of which an input means can be connected such that inputs can be made via said connections if the communication connection to the mobile computer unit is faulty. A significant advantage of the invention is that there is no need for a stationary display unit in the form of a user interface (e.g. a VT), and instead the mobile computer unit is used to display machine-specific information and input machine-specific commands.

Known agricultural machines have their own machine-specific bus system, which generates a data network. The control unit can be integrated in a secure data network of this type by a corresponding secure connection being established. Authentication can take place by means of appropriate identification data, which are sent from the control unit to corresponding control devices of the agricultural machine or to other possible participants of the data network and verified thereby.

The control unit or the microcontroller comprises at least one interface for connection to the machine's bus system. Other participants to which the control unit is connected for data exchange can be logged into the data network provided by the bus system. Therefore, machine-specific information from the participants can also be displayed on the mobile computer unit and machine-specific commands for controlling the participants can be made by means of the mobile computer unit. The machine-specific bus system is preferably an ISOBUS data network. ISOBUS refers to the ISO 11783 standard, in which interfaces and connections of the data network, in particular of the control unit, comply with the ISO 11783 standard. The agricultural machine can comprise appropriate possible connections, via which the participants connect to the ISOBUS. Participants of this type are for example mounted implements.

The microcontroller comprises a chip and a processor, as well as means for setting up a wired or wireless communication connection. In a particular embodiment, part or all of a working and program memory can also be provided on the chip. As the communication means, the microcontroller can comprise, inter alia, CAN, LIN, USB, I$^2$C, SPI, serial and/or Ethernet interfaces, PWM outputs, LCD control devices and drivers, and analogue-digital converters. Furthermore, the microcontroller can also comprise programmable digital and/or analogue functional blocks. By means of the interfaces or connections, it is possible in particular to establish a connection to the tractor control device via the tractor bus connection.

The data can be exchanged via the communication connection in both directions, i.e. the mobile computer unit can receive data from the control unit and also send data thereto. However, programming the microcontroller appropriately ensures that only information specified beforehand is displayed on the computer unit and also that only certain commands can be input from said computer unit. Since there can be a wireless communication connection between the mobile computer unit and the control unit, and the mobile computer unit therefore does not have to be rigidly installed in the driver's cab, the mobile computer unit can also be used outside the driver's cab. However, providing the communication connection can depend on the distance between the control unit and the mobile computer unit, and so the usage may be limited to a particular distance. As necessary, the mobile computer unit can be fitted in a receptacle in the driver's cab of the agricultural machine and connected to the control unit in a wireless or wired manner. In this regard, it may be advantageous for there to already be suitable connections in the receptacle so that the mobile computer unit is connected directly to the control unit in a wired manner by being placed in the receptacle.

In a preferred embodiment, the microcontroller comprises at least one hardware interface for establishing a WLAN, Bluetooth or NFC connection. However, it may also be advantageous for the control unit to comprise a component having a hardware interface for establishing a WLAN, Bluetooth or NFC connection. It goes without saying that a plurality of hardware interfaces can also be provided for establishing the WLAN, Bluetooth or NFC connection. The component can, for example, be a networking device or another electronic device that comprises said hardware interfaces and can be connected to the control unit, in particular to the microcontroller. The wired connection can, for example, be an Ethernet connection, which has high transfer rates and fast access times. Advantageously, the mobile computer unit authenticates itself at the control unit by means of identification data, and so a secure, in particular encrypted, wireless or wired connection can be established between the control unit and the mobile computer unit. The connection can be terminated either manually or automatically. For this purpose, the microcontroller can be provided, which not only takes on the management of the interfaces but also the monitoring thereof. The microcontroller also takes on the network management and controls the manner in which the possible accesses to the machine's bus system are controlled. In addition, the microcontroller can act as a task control device and can be the interface between a farm management system and the device control.

Furthermore, the control unit can have a hardware switch, by which the communication means can be switched on or off. By means of the hardware switch, the wireless or wired communication connection can thus be switched on or off. This is advantageous since the driver of the agricultural machine can switch on the communication connection as necessary and can thus establish a connection to the mobile computer unit. In another embodiment, the mobile computer unit can also comprise a hardware switch, by which a hardware interface of the computer unit is activated. However, the computer unit can have a program that can be used to activate the hardware interface of the mobile computer unit in this manner. In the event of a hardware or software error, the microcontroller can be brought into a rest state, in which a wireless connection to the mobile computer unit cannot be established either.

According to the invention, it is proposed to design the mobile computer unit as a handheld terminal having a touch-sensitive screen. A significant disadvantage of the user interface in the form of a VT is that the resolution of the display is often low since technical components of the user interface no longer meet the current technical standard. The mobile computer unit can, however, be designed as a handheld terminal having a touch-sensitive screen which substantially meets the current technological level. The mobile computer unit can, for example, be a laptop, a tablet computer, a smartphone or another mobile electronic device that advantageously has a touch-sensitive screen and the necessary hardware interfaces for connection to the control unit. The system according to the invention allows the mobile computer unit to be exchanged in a flexible manner, and so any computer unit that meets the current technical standard can be connected to the control unit.

Once the communication connection to the control unit has been established, the information to be displayed on the mobile computer unit can be shown on the computer unit either automatically or manually. For example, the hardware switch on the control unit can be provided for this purpose, the information being shown on the screen of the mobile computer unit once said switch has been activated. The decision of which machine-specific information is displayed on the mobile computer unit is controlled by the microcontroller and may, for example, have been specified in advance by software. Furthermore, it is proposed that the machine-specific information is automatically shown on the mobile computer unit once the connection has been set up.

It is proposed that the control unit comprises acoustic and/or optical means which are used, for example, to signal that the communication connection is broken. The optical means can be illumination means, such as LEDs, arranged on the control unit. Noise generators that are also connected to the control unit and generate signals or warning sounds can be used as acoustic means. By means of the acoustic and/or optical means, it can be communicated to the driver of the agricultural machine that there are errors in the communication connection or that said connection is broken. Furthermore, the mobile computer unit can also have means of this kind in order to display to the driver or to the operator of the mobile computer unit that the communication connection is broken or disrupted.

To display the machine-specific information on the mobile computer unit, it is possible to use the web browser thereof or any other program that can be used to display information graphically. Advantageously, machine-specific commands can also be input by means of the mobile computer unit. The input commands are checked by the control unit or the microcontroller and implemented when positively verified, more specifically sent to the tractor control device or to a control device of a mounted implement.

BRIEF DESCRIPTION OF THE DRAWINGS

The invention will now be described in more detail on the basis of an embodiment of the invention shown in the drawings, in which:

FIG. 1 shows a block diagram of a preferred system for an agricultural machine.

DETAILED DESCRIPTION OF THE DRAWINGS

The system of an agricultural machine comprises a programmable electronic control unit 1 that comprises a microcontroller (not shown) having at least one interface for connection to the bus system 2 belonging to the machine. The control unit 1 is connected to both the machine's bus system 2 and a mobile computer unit 3, which is used to display machine-specific information and to input machine-specific commands. The control unit 1 can, for example, comprise a housing made of metal or plastics material, in which appropriate hardware interfaces or connections are integrated. The control unit 1 comprises wired or wireless communication means for setting up a wired or wireless communication connection 4 to the mobile computer unit 3, such that the control unit 1 is connected for data exchange to a mobile computer unit 3. In addition to a display, the mobile computer unit 3 also comprises input means, e.g. switches or buttons, by which inputs can be made and thus machine-specific commands can be input. However, the mobile computer unit 3 can also be designed as a handheld terminal having a touch-sensitive screen, such that inputs can be made by means of the touch-sensitive screen and there is no need for input means.

The control unit 1 comprises at least one interface for connection to the machine's bus system 2, in particular an ISOBUS, and allows the control unit 1 to communicate with a tractor control device 5 for data exchange. The bus system 2 uses means that comply with the ISO 11783 standard. In addition to the physical properties of the network, such as plugs and lines, the standard also defines the type of participation and data formats and interfaces. Applications based on the ISO 11783 standard are known under the name ISOBUS. The tractor control device 5 is in principle a job computer fitted on the tractor or the carrier vehicle and provides information such as travelling speed, power take-off speed, lighting system status, etc. in the form of notifications. The tractor control device 5 is an information bridge between a closed tractor bus and the open bus system 2, and so no external manipulation is possible.

Furthermore, participants 6, e.g. mounted implements, can also be connected to the bus system 2 and can use means that comply with the ISO 11783 standard. Since the control unit 1 is also integrated in the bus system 2, a connection can be established to the participant 6 that has logged in via the bus system 2. As a result, the control unit 1 also receives machine-specific information from the participant 6 and can also send machine-specific commands thereto.

A significant advantage of the system is that the control unit acts as a link between the machine's bus system 2 and the mobile computer unit 3, the microcontroller substantially being the bottleneck and controlling which data reach the bus system 2 from the mobile computer unit 3, and vice versa. The separation between the open wired or wireless communication connection 4 and the machine's bus system 2 is shown schematically by the diagonal connecting line in the control unit 2.

Known man-machine interfaces, e.g. the VT, are arranged in the driver's cab of the agricultural machine, and so operation is limited purely to the driver's cab. However, the mobile computer unit 3 is connected to the control unit 1, it being possible for the connection to be either wired or wireless. The microcontroller of the control unit 1 comprises hardware interfaces by which the data-exchange communication connection 4 to the mobile computer unit 3 is established. The mobile computer unit 3 is, for example, a tablet computer having a touch-sensitive screen, and also has hardware interfaces for establishing the connection 4 to the control unit 1. A connection 4 of this type can be established, for example, via WLAN, Bluetooth or NFC. Other connection protocols such as LTE can also be used. The connection 4 between the control unit 1 and the mobile computer unit 3 is established by means of wired or wireless communication means. Such means include, for example, WLAN or Ethernet interfaces. WLAN, or "wireless" LAN, refers to a wireless local radio network that complies with the IEEE-802.22 family standard.

After a user has logged the mobile computer unit 3 into the control unit 1 and the mobile computer unit 3 has been authenticated, the user can decide what is displayed on the mobile computer unit 3. However, the information shown can also be predefined by programming the microcontroller appropriately. Machine-specific information is displayed on the mobile computer unit 3, but said unit can also be used to input machine-specific commands, it being possible for the connection 4 to be based on a TCP/IP network protocol and identification taking place by means of IP addresses. The information can be displayed on the mobile computer unit 3, for example, by means of a common web browser or a program installed on the computer unit 3.

If inputs are made by means of the mobile computer unit 3, they are sent to the control unit 1 and, if verified by the microcontroller, are passed to a control device of a participant 6 of the bus system 2 or to the tractor control device 4 by the microcontroller or the control unit 1. Therefore, not only can machine-specific information be displayed by the mobile computer unit 3, but said unit can also be used to make machine-specific inputs. Since the connection 4 between the mobile computer unit 3 and the control unit 1 is preferably wireless, the mobile computer unit 3 can also be used outside the driver's cab. The connection 4 is merely limited by the range of the radio connection. The user is thus free to make adjustments by means of the mobile computer unit 3 to, for example, a mounted implement connected to the bus system 2, and to review these adjustments directly at the mounted implement. Another advantage is that the user can freely select the mobile computer unit 3 and can thus also decide on the technical features thereof, for example the resolution of the screen. A user can also connect a smartphone to the control unit 1 as a mobile computer unit 3 and benefit from the advantages of such a device, such as low weight, high processing and computing speed, high screen resolution and flexible usage.

The control unit 1 can also log into the bus system of the agricultural machine as an additional VT or a VT can be integrated in the bus system in addition to the control unit 1.

What is claimed is:

1. System for displaying machine-specific information and inputting machine-specific commands, the system comprising:

an agricultural machine comprising a vehicle and a motor configured to drive the vehicle, the vehicle comprising a tractor control device and an open machine-specific tractor bus system according to the ISO 11783 standard, a programmable electronic control unit comprising a microcontroller having an interface for establishing a wired connection to communicate with the machine-specific tractor bus system through the tractor control device for data exchange, and further comprising an electronic device comprising at least one hardware interface for establishing a wireless connection, a mobile computer comprising a display and data input unit, and mounted implements connected to the bus system, wherein machine-specific information from the mounted implements are displayed on the mobile computer and machine-specific commands for controlling the mounted implements are made by the computer unit, wherein the microcontroller acts as a task control device and is an interface between a farm management system and the tractor control device, wherein the electronic device is connected to the mobile computer via the wireless connection, wherein the wireless connection between the mobile computer and the programmable electronic control unit is based on a TCP/IP network protocol and identification takes place using IP addresses, wherein the programmable electronic control unit has a hardware switch configured to switch on or off the wireless connection, wherein the display and data input unit comprises a display screen and operating elements, wherein information is shown on the display screen once the hardware switch has been activated, wherein the tractor control device is configured as an information bridge between a closed tractor bus and the open machine-specific tractor bus system according to the ISO 11783 standard, and wherein the mobile computer exchanges data with the programmable electronic control unit via a wireless local area network, authenticates itself at the programmable electronic control unit using identification data to establish between the programmable electronic control unit and the mobile computer unit a secure NFC connection and a secure connection via a wireless standard IEEE 802.15.1 using short-wavelength UHF radio waves in the ISM band from 2.400 to 2.485 GHz, and is used for displaying machine-specific information and inputting machine-specific commands, the programmable electronic control unit acting as a link between the machine-specific tractor bus system and the mobile computer, the microcontroller conducting a verification process between the wireless connection and the bus system controlling which data reach the bus system from the mobile computer, and vice versa, wherein commands inputted through the mobile computer are checked by the microcontroller and, when positively verified by the microcontroller, sent to the tractor control device or to a control device of a mounted implement of the mounted implements, and wherein a decision of which machine-specific information is displayed on the mobile computer is controlled by the microcontroller and is specified in advance, and in case of a hardware or software error, the microcontroller being brought into a rest state wherein the wireless connection to the mobile computer unit cannot be established.

2. System according to claim 1, wherein the machine-specific tractor bus system is an ISOBUS data network.

3. System according to claim 1, wherein the microcontroller comprises at least one hardware interface for establishing a wired connection according to ISO 11783.

4. System according to claim 1, wherein the electronic device comprises a further hardware interface for establishing a wireless connection.

5. System according to claim 1, wherein the agricultural machine is a tractor and wherein the microcontroller is connected to the tractor control device via the machine-specific tractor bus connection.

6. System according to claim 1, wherein the mobile computer is designed as a handheld terminal having a touch-sensitive screen.

7. System according to claim 1, wherein the programmable electronic control unit comprises an acoustic signal generator and/or an optical signal generator.

8. System according to claim 1, wherein the programmable electronic control unit has a display unit.

9. System according to claim 1, wherein the mobile computer comprises a hardware interface for establishing the secure NFC connection.

* * * * *